United States Patent
Braun et al.

(10) Patent No.: US 7,874,812 B2
(45) Date of Patent: Jan. 25, 2011

(54) SUCTION JET PUMP WITH RIBS FOR GUIDING THE FLOW OF FUEL

(75) Inventors: Hans-Peter Braun, Renfrizhausen (DE); Gerald Zierer, Rastatt-Wintersdorf (DE); Thomas Wieland, Stuttgart (DE); Petr Simek, Hrdejovice (CZ); Pavel Motka, Postrelmov (CZ); Roman Snejda, Ceske Budejovice (CZ); Daniel Pridal, Hradiste (CZ); Josef Jagos, Ceske Budejovice (CZ); Daniel Siska, Horazdovicecz (CZ); Tomas Slanec, Ceske Budejovice (CZ); Franz Hacker, Hitzhofen/Hofstetten (DE)

(73) Assignee: Robert Bosch GmbH, Stuttgart (DE)

( * ) Notice: Subject to any disclaimer, the term of this patent is extended or adjusted under 35 U.S.C. 154(b) by 935 days.

(21) Appl. No.: 10/589,471

(22) PCT Filed: Nov. 17, 2004

(86) PCT No.: PCT/EP2004/052991

§ 371 (c)(1),
(2), (4) Date: Apr. 4, 2007

(87) PCT Pub. No.: WO2005/080783

PCT Pub. Date: Sep. 1, 2005

(65) Prior Publication Data

US 2007/0217922 A1 Sep. 20, 2007

(30) Foreign Application Priority Data

Feb. 14, 2004 (DE) ................. 10 2004 007 319

(51) Int. Cl.
*F04F 5/44* (2006.01)
(52) U.S. Cl. ....................... 417/198; 417/194
(58) Field of Classification Search ............... 417/151, 417/194, 198
See application file for complete search history.

(56) References Cited

U.S. PATENT DOCUMENTS

| | | | | |
|---|---|---|---|---|
| 3,134,338 A | * | 5/1964 | Dodge | 417/194 |
| 3,166,020 A | * | 1/1965 | Cook | 417/198 |
| 3,667,069 A | * | 6/1972 | Blackshear et al. | 623/3.1 |
| 4,522,141 A | * | 6/1985 | Aker | 114/40 |

FOREIGN PATENT DOCUMENTS

| | | |
|---|---|---|
| DE | 42 01 037 A1 | 7/1993 |
| DE | 44 00 958 A1 | 4/1995 |
| DE | 198 56 298 C1 | 2/2000 |

* cited by examiner

*Primary Examiner*—Charles G Freay
(74) *Attorney, Agent, or Firm*—Ronald E. Greigg

(57) ABSTRACT

In known devices for pumping fuel, suction jet pumps are used which are driven by the fuel flowing back from the internal combustion engine and pump fuel from a supply tank into an impoundment container of a fuel pumping unit. In known suction jet pumps, the suction power is limited by the fact that the fuel stream applies itself to the housing wall, so that the entire area of the fuel stream is no longer available for entraining fuel. The device of the invention lessens this effect by providing at least one rib between the first partial section of the fuel line and the mixing conduit.

15 Claims, 2 Drawing Sheets

SUCTION JET PUMP WITH RIBS FOR GUIDING THE FLOW OF FUEL

CROSS-REFERENCE TO RELATED APPLICATION

This application is a 35 USC 371 application of PCT/EP 2004/052991 filed on Nov. 17, 2004.

BACKGROUND OF THE INVENTION

1. Field of the Invention

The invention directed to an improved device for pumping fuel.

2. Description of the Prior Art

A device for pumping fuel known from German Patent DE 198 56 298 C1 has a suction jet pump that has a fuel line and a mixing conduit; in a first partial section of the fuel line, oriented toward the mixing conduit, a nozzle-like constriction with a nozzle opening is provided, and the fuel line communicates fluidically with the mixing conduit via the nozzle opening. The mixing conduit is embodied at a storage container, and the nozzle-like constriction is disposed as a separate part on the end of the fuel line toward the mixing conduit. The suction jet pump aspirates fuel from a supply tank via an intake opening into an intake chamber. The aspirated fuel, because of the dynamics of the fuel that does not enter the intake chamber parallel to the fuel stream direction, has a tendency to deflect the fuel stream toward a wall of the mixing conduit, so that in an unfavorable case this stream applies itself to the wall and flows along it. As a result, the full surface area of the fuel stream is no longer available for entraining fuel, and the suction power is thus reduced markedly.

Because of tolerances between the nozzle and the fuel line, the nozzle, after installation in the fuel line, must be checked for whether it is oriented in the direction of the mixing conduit and the fuel stream extends in the direction of the mixing conduit rather than obliquely to it, so that the fuel stream will not strike the wall of the mixing conduit after a certain distance and contact it there.

SUMMARY AND ADVANTAGES OF THE INVENTION

The device according to the invention has the advantage over the prior art that the device of the invention is improved in a simple way, because with the same quantity of fuel stream a higher pumping capacity is achieved because the fuel stream is prevented from being applied to the housing wall. Because at least one rib is provided between the first partial section of the fuel line and the mixing conduit, the fuel flowing into the suction jet pump is deflected, guiding the flow, in such a way that the fuel stream undergoes no deflection, or only slight deflection, in the direction of the wall of the mixing conduit.

It is especially advantageous if the at least one rib connects the first partial section of the fuel line to the mixing conduit in one piece, since the nozzle of the fuel line is in this way oriented in a defined way to the mixing conduit. After the assembly of the device, the additional check whether the nozzle is correctly oriented is thus unnecessary.

In an advantageous feature, the at least one rib is flat or curved in the flow direction.

It is also advantageous if the at least one rib, originating at the first partial section of the fuel line, extends in the axial and radial direction as far as the mixing conduit.

It is highly advantageous if the at least one rib protrudes past the nozzle opening in the direction of the mixing conduit.

It is also advantageous if a plurality of ribs are disposed about the first partial section of the fuel line, since in this way a stable communication between the first partial section, having the nozzle, and the mixing conduit and good flow guidance are achieved.

It is furthermore advantageous if between the first partial section of the fuel line and the mixing conduit, an annular inlet opening into the mixing conduit is provided, since in this way the nozzle can be completely bypassed by the flow, and the fuel aspirated by the fuel stream enters the mixing conduit at least approximately parallel to the fuel stream. As a result, the deflection of the fuel stream is at least greatly reduced.

It is furthermore advantageous if the wall thickness of the at least one rib, viewed in the axial direction with respect to an axis of the mixing conduit, is small compared to the cross section of the inlet opening of the mixing conduit, since in this way the fuel aspirated by the fuel stream is made the least turbulent.

It is also advantageous if the first partial section of the fuel line, having the nozzle-like constriction, and the mixing conduit are inserted into a housing of the suction jet pump, since in this way a very simple assembly of the device is attainable.

BRIEF DESCRIPTION OF THE DRAWINGS

One exemplary embodiment of the invention is described in further detail in the ensuing description, taken in conjunction with the drawings, in which.

DESCRIPTION OF THE PREFERRED EMBODIMENTS

Figure 1:
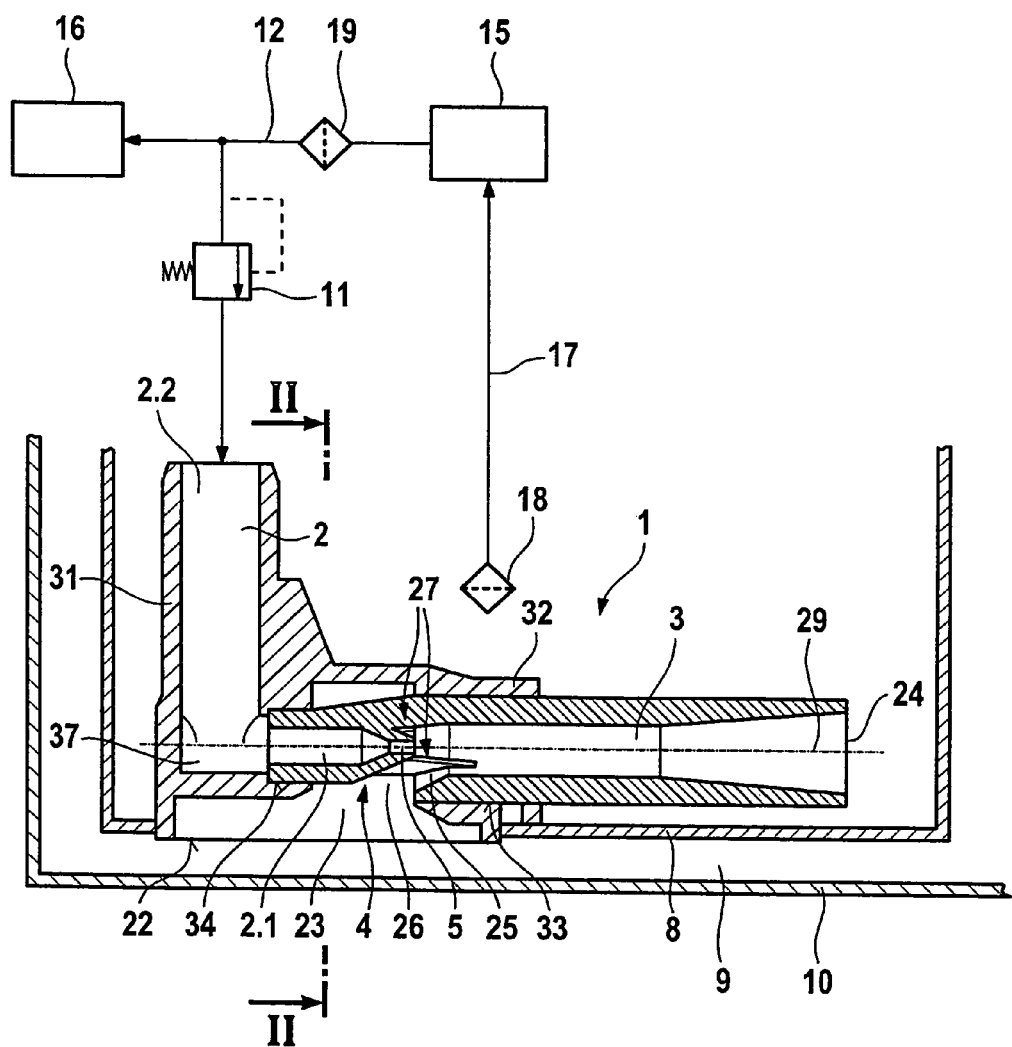
FIG. 1 shows a view of the device of the invention in section.

The device of the invention has a suction jet pump 1, with a fuel line 2 and a mixing conduit 3. In a first partial section 2.1 of the fuel line 2, oriented toward the mixing conduit 3, a nozzle-like constriction 4, hereinafter called a nozzle, with a nozzle opening 5 is provided; the fuel line 2 communicates fluidically with the mixing conduit 3 via the nozzle opening 5.

The suction jet pump 1 is disposed for instance in a storage container 8 and pumps fuel from a supply tank 9 into the storage container 8. The storage container 8 is located inside the supply tank 9, for instance near a tank bottom 10 of the supply tank 9.

The first partial section 2.1 of the fuel line 2 and the mixing conduit 3 are disposed for instance in the direction of the tank bottom 10; this is also known as a horizontal disposition of the suction jet pump 1. A disposition of the first partial section 2.1 of the fuel line 2 and of the mixing conduit 3 that is perpendicular to the tank bottom 10, or vertical, is equally possible, however.

A second partial section 2.2 of the fuel line 2 communicates fluidically, for instance via a pressure regulating valve 11, with a pressure line 12, which extends from a pumping unit 15 to an internal combustion engine 16 and supplies the latter with fuel. The pumping unit 15 is disposed for instance in the storage container 8 and aspirates fuel via an intake line 17, in which a prefilter 18 is for instance provided, and pumps the fuel at elevated pressure to the engine 16 via the pressure line 12. In the pressure line 12, a main filter 19 is for instance provided, which filters out fine dirt particles contained in the fuel. From the pressure line 12, for instance downstream of the main filter 19, the fuel line 2 branches off and, when the pressure regulating valve 11 is open, supplies the suction jet pump 1 with fuel. The pressure regulating valve 11 opens when the pressure in the pressure line 12 exceeds a predetermined value and causes excess fuel to flow out of the pressure line 12 back into the storage container 10, via the fuel line 2 having the first and second partial sections 2.1, 2.2, the nozzle 4, and the mixing conduit 3 of the suction jet pump 1. The suction jet pump 1 aspirates fuel from the supply tank 9 in a known manner; via an intake opening 22, the fuel reaches an intake chamber 23 of the suction jet pump 1.

The suction jet pump 1 may, however, also expressly be supplied via a return line that pumps excess fuel from the engine 16 back into the supply tank 9. The suction jet pump 1 may also communicate fluidically with the pressure line 12 both upstream and downstream of the main filter 19, the pressure of the pressure line 12 being lowered, for instance by means of a throttle.

The fuel from the fuel line 2 flows via the nozzle opening 5 of the nozzle 4 in the form of a so-called fuel stream into the intake chamber 23; beginning at the nozzle 4, the fuel stream passes through the intake chamber 23 and extends as far as the mixing conduit 3 adjoining the intake chamber 23. The fuel stream entrains fuel from the intake chamber 23 and/or the mixing conduit 3 in the flow direction, creating an underpressure in the intake chamber 23 that causes replenishing fuel from the supply tank 9 to flow via the intake opening 22 into the intake chamber 23. The fuel of the fuel stream and the entrained fuel from the intake chamber 23 and/or from the mixing conduit 3 flow via the mixing conduit 3 and an outlet opening 24 from the mixing conduit 3 into the storage container 8. The mixing conduit 3 widens, for instance on the order of a diffusor, over a portion of its length in order to avoid or reduce flow noise.

The first partial section 2.1 of the fuel line 2 for instance extends into the intake chamber 23 and can extend as far as an inlet region 25 at the beginning of the mixing conduit 3 or even beyond it.

The fuel flowing out of the intake chamber 23 in the direction of the mixing conduit 3 bypasses the first partial section 2.1 of the fuel line 2 with the nozzle 4 and passes through an annular inlet opening 26 between the mixing conduit 3 and the first partial section 2.1 of the fuel line 2 to enter the mixing conduit 3. Because of the bypassing of the first partial section 2.1 of the fuel line 2, the flow enters the mixing conduit 3 virtually parallel to the fuel stream, so that the flow forces that deflect the fuel stream are slight.

According to the invention, between the wall of the first partial section 2.1 of the fuel line 2 and the wall of the mixing conduit 3, at least one rib 27 is provided, which orients the flow, entering through the annular inlet opening 26, in the axial direction in such a way relative to an axis 29 of the mixing conduit 3 that the flow is not made as turbulent, and the fuel stream is not deflected, or not as much, in the radial direction transverse to the axial flow direction. In this way, the entire fuel stream area can be utilized for entraining fuel out of the intake chamber 23, and thus the pumping capacity of the suction jet pump 1 is improved, given the same fuel stream quantity.

The at least one rib 27 may be disposed for instance on the wall of the first partial section 2.1 of the fuel line 2, and/or on the wall of the mixing conduit 3; the at least one rib 27 for instance extends from the first partial section 2.1 of the fuel line 2 toward the mixing conduit 3, or vice versa.

The at least one rib 27 for instance connects the first partial section 2.1 of the fuel line 2 in one piece with the mixing conduit 3. The at least one rib 27, originating for instance at the first partial section 2.1 of the fuel line 2, extends in the axial and radial direction relative to the axis 29, protrudes past the nozzle opening 5 in the direction of the mixing conduit 3, and extends for instance as far as up to and into the mixing conduit 3.

In the one-piece embodiment of the nozzle 4 and mixing conduit 3 by means of the at least one rib 27, the nozzle 4 and the mixing conduit 3 are oriented in a defined way to one another, so that the nozzle 4 with the nozzle opening 5 and the mixing conduit 3 are for instance disposed concentrically to one another.

The suction jet pump 1 is made of plastic, for instance, and the walls of the first partial section 2.1 of the fuel line 2 and of the mixing conduit 3 are produced in one piece for instance by means of injection molding in one injection molding operation.

The at least one rib 27 has a streamlined shape and is embodied as flat in platelike form or curved in the flow direction; the curvature of the at least one rib 27 may be provided to make for better unmolding of the device after the injection molding operation. The curvature of the at least one rib 27 may be embodied in the axial and/or the radial direction relative to the axis 29.

For example, a plurality of ribs 27 are provided, for instance three ribs 27, and the ribs 27 are disposed around the first partial section 2.1 of the fuel line 2 and distributed uniformly over the circumference, so that the ribs 27 divide the annular inlet opening 26 of the mixing conduit 3 into a plurality of individual partially annular openings. Because of the embodiment of the device with a plurality of ribs 27, a mechanically more-stable connection is attained between the first partial section 2.1 and the nozzle 4 and the mixing conduit 3. Moreover, in this way, the flow is guided even better in the direction of the mixing conduit 3 than if there were only one rib 27.

The first partial section 2.1 of the fuel line 2 with the nozzle-like constriction 4 and the mixing conduit 3 are inserted into a housing 31; provided on the housing 31 are for instance the second partial section 2.2, oriented toward the pressure regulating valve 1, of the fuel line 2, the intake chamber 23 with the intake opening 22, and a mount 32 for the mixing conduit 3. The housing 31 is for instance made from plastic. The second partial section 2.2 of the fuel line 2, for instance near the first partial section 2.1, has a deflection 37, which may for instance be a 90° deflection. The mount 32 has a first receiving opening 33, into which the mixing conduit 3 can be inserted. The second partial section 2.2 of the fuel line 2, on the end toward the intake chamber 23, likewise has a second receiving opening 34 for the insertion of the nozzle 4. The first receiving opening 33 and the second receiving opening 34 are for instance disposed concentrically to one another. The second receiving opening 34 is for instance embodied as a stub. The intake chamber 23 protrudes past the first receiving opening 33 and the second receiving opening 34 in the radial direction relative to the axis 29, so that the flow can bypass the circumference of the first partial section 2.1 of the fuel line 2 with the nozzle 4 and enter the mixing conduit 3 annularly.

For instance, the mixing conduit 3 is thrust, with the integrally joined first partial section 2.1 of the fuel line 2 leading, into the first receiving opening 33, until the first partial section 2.1 of the fuel line 2 protrudes into the second receiving opening 34 of the second partial section 2.2 of the fuel line 2 and tightly closes off the second receiving opening 34 from the intake chamber 23.

The assembly of the device is in this way greatly simplified, compared to the prior art.

Figure 2:
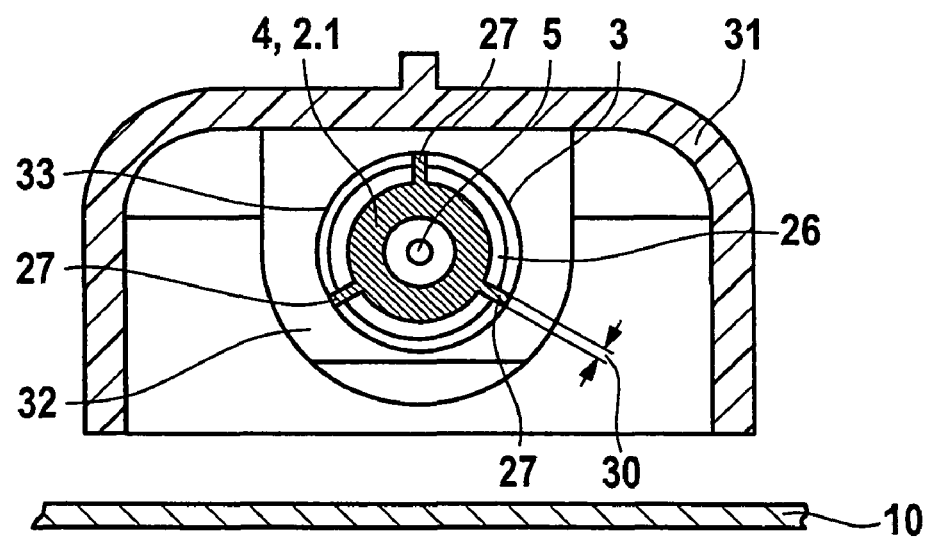
FIG. 2 is a side view of the device of the invention of FIG. 1, taken along the line II-II.

FIG. 2 shows a sectional view of the device of the invention of FIG. 1, taken along the line II-II. In the device of FIG. 2, those elements that remain the same or function the same as in the device of FIG. 1 are identified by the same reference numerals.

The wall thickness 30 of the at least one rib 27, viewed in the axial direction relative to the axis 29 of the mixing conduit 3, is very small compared to the flow cross section of the annular inlet opening 26 of the mixing conduit 3, so as not to make the flow turbulent. The at least one rib 27, viewed in the axial direction relative to the axis 29, has a small but arbitrarily shaped cross section. For instance, this cross section is rectangular. In the exemplary embodiment of FIG. 2, three ribs 27 are provided.

The foregoing relates to a preferred exemplary embodiment of the invention, it being understood that other variants and embodiments thereof are possible within the spirit and scope of the invention, the latter being defined by the appended claims.

The invention claimed is:

1. In a device for pumping fuel, having a suction jet pump that has a fuel line and a mixing conduit, in which, in a first partial section of the fuel line oriented toward the mixing conduit, a nozzle-like constriction with a nozzle opening is provided, and the fuel line fluidly communicates with the mixing conduit via the nozzle opening, the improvement comprising at least one rib between the first partial section of the fuel line and the mixing conduit, the at least one rib connecting the first partial section of the fuel line to the mixing conduit in one piece, and a housing containing a second partial section of the fuel line in fluid communication with the first partial section of the fuel line and a mount for the mixing chamber, the mount having a first receiving opening and the second partial section of the fuel line having a second receiving opening, wherein the mixing conduit is thrust, with the integrally joined first partial section of the fuel line leading, into the first receiving opening, until the first partial section of the fuel line protrudes into the second receiving opening of the second partial section of the fuel line.

2. The device as defined by claim 1, wherein the at least one rib is flat or curved in the flow direction.

3. The device as defined by claim 1, wherein the at least one rib originates at the first partial section of the fuel line, and extends in the axial and radial directions as far as the mixing conduit.

4. The device as defined by claim 1, wherein the at least one rib protrudes past the nozzle opening in the direction of the mixing conduit.

5. The device as defined by claim 1, wherein a plurality of ribs are disposed about the first partial section of the fuel line.

6. The device as defined by claim 1, wherein the first partial section of the fuel line is disposed concentrically to the mixing conduit.

7. The device as defined by claim 1, further comprising an annular inlet opening into the mixing conduit between the first partial section of the fuel line and the mixing conduit.

8. The device as defined by claim 7, wherein the wall thickness of the at least one rib, viewed in the axial direction with respect to an axis of the mixing conduit, is small compared to the cross section of the inlet opening of the mixing conduit.

9. The device as defined by claim 1, wherein the at least one rib comprises a plurality of ribs disposed around the first partial section of the fuel line and distributed over the circumference of the first partial section.

10. The device as defined by claim 9, wherein the plurality of ribs comprises three ribs disposed around the first partial section of the fuel line and distributed over the circumference of the first partial section.

11. The device as defined by claim 7, wherein the at least one rib divides the annular inlet opening into a plurality of individual inlet openings.

12. The device as defined by claim 1, wherein the first partial section and the second partial section are disposed concentrically to one another.

13. The device as defined by claim 1, wherein the suction jet pump has an intake chamber and the second partial section on an end toward the intake chamber has the second receiving opening for receiving the first partial end of the fuel line.

14. The device as defined by claim 13, wherein the intake chamber protrudes past the first receiving opening and the second receiving opening in a radial direction relative to the axis of the mixing conduit so that flow can bypass the circumference of the first partial section and enter the mixing conduit annularly.

15. The device as defined by claim 13, wherein the first partial section of the fuel line protruding into the second receiving opening of the second partial section of the fuel line tightly closes off the second receiving opening from the intake chamber.

* * * * *